United States Patent
Benson et al.

(10) Patent No.: US 6,668,294 B1
(45) Date of Patent: Dec. 23, 2003

(54) DATA CORRUPTION AVOIDANCE ON A BACKPLANE BUS ADAPTED TO RECEIVE BUS CONTROLLER CARDS OF DIFFERENT TYPES

(75) Inventors: Anthony J Benson, Roseville, CA (US); Patrick McGoey, Cameron Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

(21) Appl. No.: 09/810,964

(22) Filed: Mar. 17, 2001

(51) Int. Cl.$^7$ .................. G06F 13/00; G06F 3/00; G06F 15/177

(52) U.S. Cl. .................. 710/104; 710/10; 710/16; 713/1

(58) Field of Search .................. 710/100, 300–304, 710/104, 8–19; 713/1, 2, 100

(56) References Cited

U.S. PATENT DOCUMENTS

| | | | | |
|---|---|---|---|---|
| 5,938,776 A | * | 8/1999 | Sicola et al. | 714/25 |
| 6,065,096 A | * | 5/2000 | Day et al. | 711/114 |
| 6,085,333 A | * | 7/2000 | DeKoning et al. | 714/7 |
| 6,449,680 B1 | * | 9/2002 | Sanders et al. | 710/316 |
| 6,557,049 B1 | * | 4/2003 | Maloy et al. | 710/8 |

* cited by examiner

Primary Examiner—Sumati Lefkowitz

(57) ABSTRACT

A backplane having a bus is adapted to receive two bus controller cards of the same model. One of the bus controller cards becomes a master card and the other becomes a servant card. Each of the bus controller cards has a bank of switches that may be set to compatible positions. The positions of the switches on the two bus controller cards are compared, and the servant card is disconnected if its switches are not set to positions compatible with those of the master card. The backplane also may be adapted to receive different models of bus controller cards. Where two different models of bus controller cards are present on the backplane at the same time, one of the cards is not connected to the bus in order to prevent corruption or loss of data traveling over the bus.

12 Claims, 6 Drawing Sheets

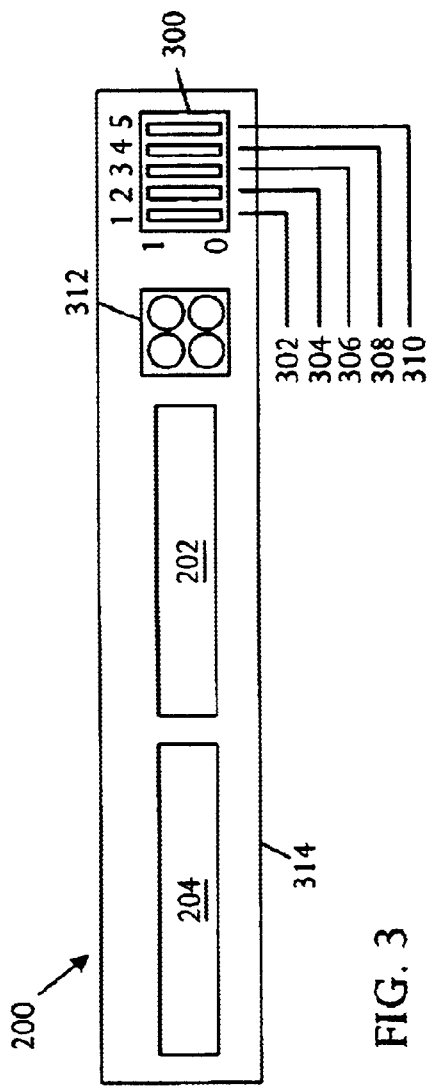
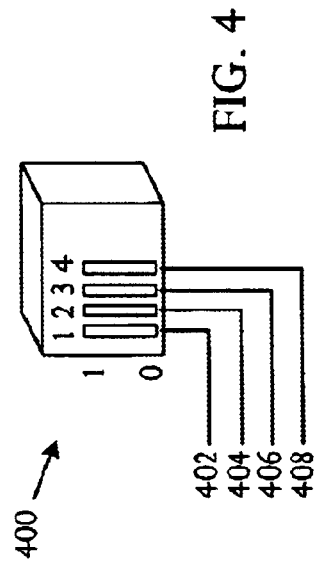
FIG. 3
FIG. 4

DATA CORRUPTION AVOIDANCE ON A BACKPLANE BUS ADAPTED TO RECEIVE BUS CONTROLLER CARDS OF DIFFERENT TYPES

CROSS-REFERENCES

The present invention is related to subject matter disclosed in the following co-pending patent applications:

1. United States patent application entitled, "Redundant, High-Availability Storage System" (Ser. No. 09/811,194), naming Anthony J. Benson and James J. deBlanc as inventors and filed on even date herewith;

2. United States patent application entitled, "Multiple-Path Interface Card for Interfacing Multiple Isolated Interfaces to a Storage System" (Ser. No. 09/811,193), naming Anthony J. Benson and James J. deBlanc as inventors and filed on even date herewith;

3. United States patent application entitled, "DIP Switch Configuration for Increased Usability with Multiple Cards" (Ser. No. 09/810,965), naming Anthony J. Benson, Chadi Theodossy, and Joanna Baisden as inventors and filed on even date herewith;

4. United States patent application entitled, "Circuit for Switching One or More HVD Transceivers" (Ser. No. 09/811,192), naming Anthony J. Benson as inventor and filed on even date herewith;

5. United States patent application entitled, "Management of Communication Bus Resets" (Ser. No. 09/810,963), naming Anthony J. Benson, James L. White and Dovard K. Howard as inventors and filed on even date herewith; and 6. United States patent application entitled, "Master-Slave Communication Bus Controllers" (Ser. No. 09/811,196), naming Anthony J. Benson, James L. White and Dovard K. Howard as inventors and filed on even date herewith.

FIELD OF THE INVENTION

This invention relates to bus controller cards, and more particularly to preventing conflicts between bus controller cards.

BACKGROUND

Mass storage units are commonly used in applications where large amounts of data need to be stored. Typically, such mass storage units each contain a number of disk drives connected via a bus, such as a Small Computer System Interface (SCSI) bus that is standard in the art. Such mass storage units typically include one or more bus controller cards to control the bus. Those one or more cards generally connect to a backplane on which the bus is implemented. Bus controller cards may be configured via switches, jumpers or other physical controls on the cards that allow a user to reconfigure the cards as needed. Bus addressing and termination of each card is typically controller via such switches.

The backplane may include slots for two or more bus controller cards. However, the use of two or more bus controller cards can introduce compatibility and data corruption problems. For example, where two bus controller cards of the same type are used, and the switches on each card set bus addressing and termination in an incompatible manner, undesirable effects may occur, such as corruption or loss of data sent across the bus, and bus lockup. As another example, the backplane may be capable of receiving two different and incompatible bus controller cards, for purposes of backward compatibility or the like. If those two incompatible cards are inadvertently inserted at the same time, problems such as data loss or corruption, or bus lockup, may occur.

SUMMARY

A backplane having a bus may receive two bus controller cards, of the same type or of different types, and one of those cards may be disconnected if incompatible with the other to prevent data corruption on the bus.

In one aspect of the invention, a backplane having a bus is adapted to receive two bus controller cards of the same model. One of the bus controller cards is a master card and the other is a servant card. Each of the bus controller cards has a bank of DIP switches that may be set to compatible positions. The positions of the DIP switches on the two bus controller cards are compared, and the servant card is disconnected if its DIP switches are not set to positions compatible with those of the master card, thereby preventing corruption or loss of data traveling over the bus.

In another aspect of the invention, a backplane having a bus is adapted to receive different models of bus controller cards. Where two different models of bus controller cards are present on the backplane at the same time, one of the cards is not connected to the bus in order to prevent corruption or loss of data traveling over the bus.

The invention will be more fully understood upon consideration of the detailed description below, taken together with the accompanying drawings.

BRIEF DESCRIPTION OF THE DRAWINGS

FIG. 3 is a schematic end view of a bus controller card.

FIG. 4 is a schematic view of an internal DIP switch of a bus controller card.

Use of the same reference symbols in different figures indicates similar or identical items.

DETAILED DESCRIPTION

Figure 1:
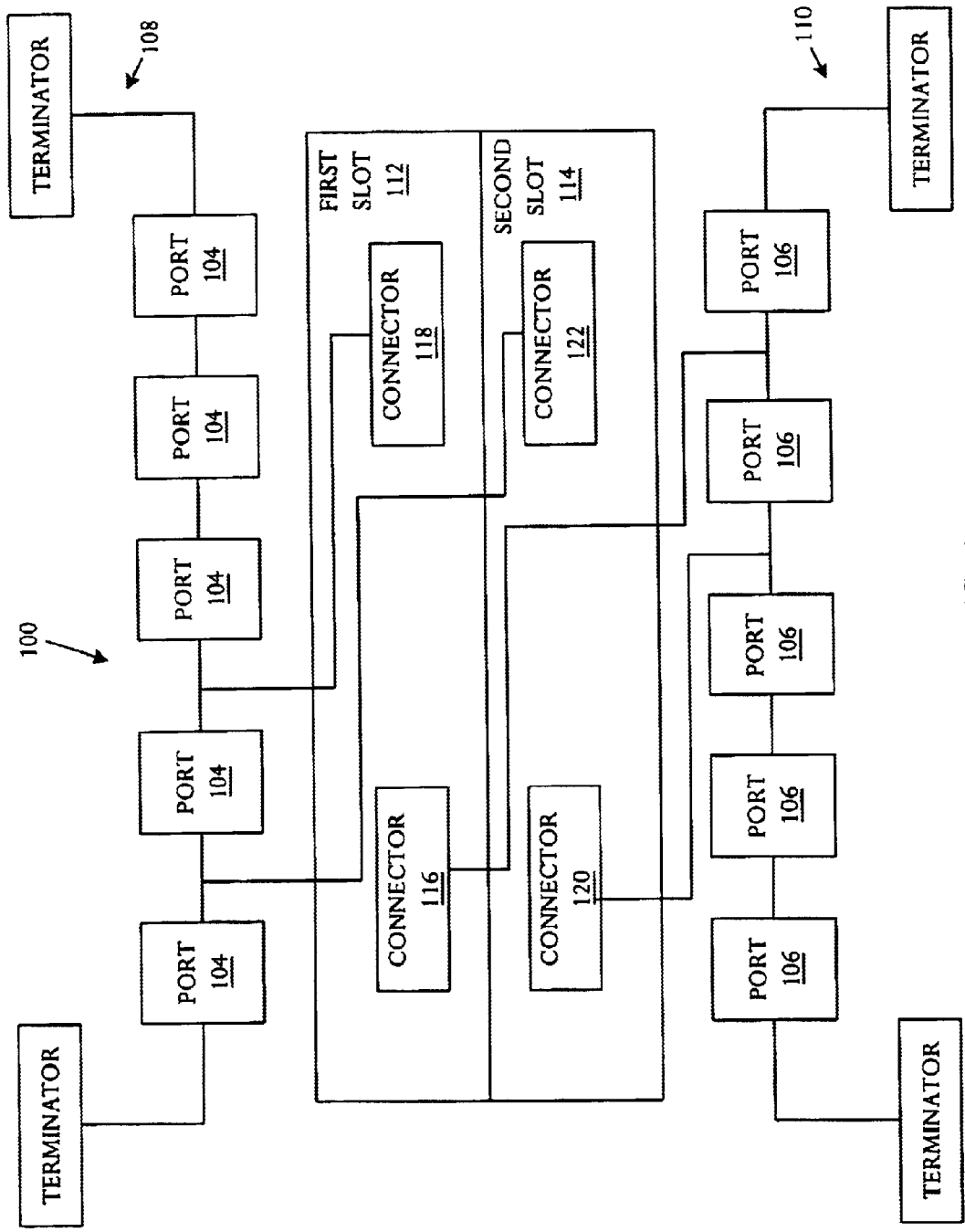
FIG. 1 is a schematic view of a backplane having a SCSI bus divided into a group of even ports and a group of odd ports, and two slots for receiving bus controller cards.

Referring to FIG. 1, a schematic of a backplane 100 is shown. The backplane 100 is preferably a printed circuit board that may be utilized as a component within another assembly, such as a mass storage unit. A first bus 108 and a second bus 110 are implemented on the backplane 100, preferably as standard SCSI buses. However, the buses 108, 110 may be another type of bus, if desired. The first bus 108 preferably includes a number of ports 104, each preferably having the same physical configuration. The ports 104 each are adapted to connect to a peripheral device, such as a disk drive. The second bus 110 preferably includes a number of ports 106, each preferably having the same physical configuration. The ports 106 each are adapted to connect to a peripheral device, such as a disk drive.

A first bus controller slot 112 and a second bus controller slot 114 are preferably included on the backplane 100. The first bus controller slot 112 preferably includes a first connector 116 electrically connected to the second bus 110, and a second connector 118 electrically connected to the first bus 108. The second bus controller slot 114 preferably includes a first connector 120 electrically connected to the second bus 110, and a second connector 122 electrically connected to the first bus 108. The connectors 116, 118 in the first bus controller slot 112 are physically and electrically configured to receive a bus controller card. The connectors 120, 122 in the second bus controller slot 114 are also physically and electrically configured to receive a similar or identical bus controller card. Preferably, the first bus 108 and the second bus 110 are connected only through one or more bus controller cards inserted into the first bus controller slot 112 and/or the second bus controller slot 114. That is, the first bus 108 is separated physically and electrically from the second bus 110, such that the only connection or connections between the two partitions 108, 110 are made via one or more bus controller cards.

Figure 2:
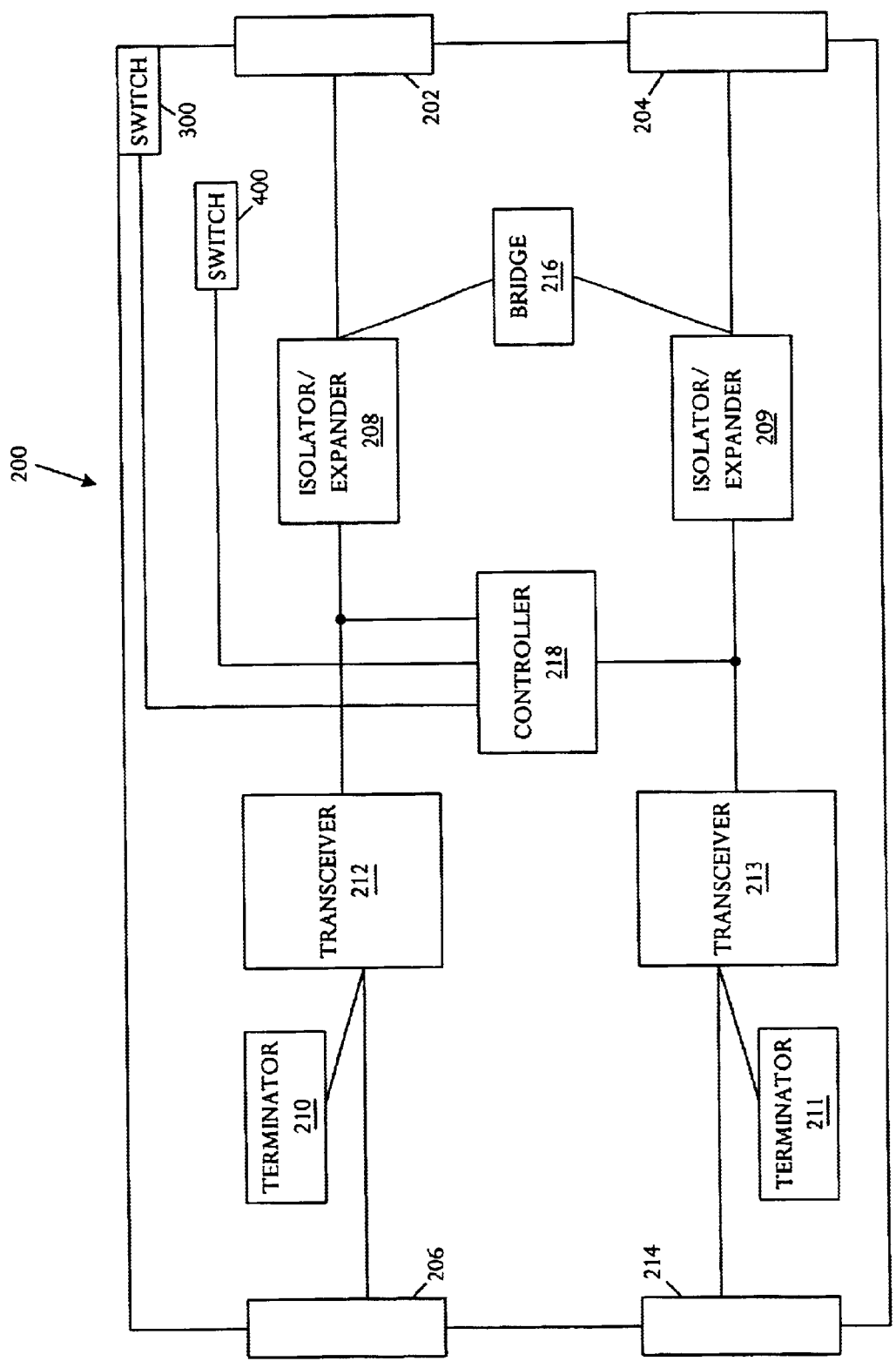
FIG. 2 is a schematic view of a bus controller card.

Referring as well to FIG. 2, a schematic of a bus controller card 200 is shown. Preferably, the bus controller card 200 is physically and electrically adapted to be received by either the first bus controller slot 112 or the second bus controller slot 114. The bus controller card 200 includes a first backplane connector 202 and a second backplane connector 204, physically and electrically adapted to interface with the connectors 116, 118 in the first bus controller slot 112, or the connectors 120, 122 in the second bus controller slot 114. The first backplane connector 202 and the second backplane connector 204 may be any type of connector useful for electrically linking the card 200 to the backplane 100. In one embodiment, the first backplane connector 202 and the second backplane connector 204 are both 240 pin count connectors available from Berg-Metral, part number 73981-102. The physical configuration of the first backplane connector 202 and the second backplane connector 204 on the card 200 is determined by the physical positioning of the connectors 116, 118, 120, 122 in each bus controller slot 112, 114.

The first backplane connector 202 is electrically connected to a first host connector 206 on the card 200, where the first host connector 206 is adapted for connection to a host computer (not shown). Between the first backplane connector 202 and the first host connector 206, the card 200 may include one or more electrical components, depending on the particular configuration of the card 200. Preferably, where the first host connector 206 receives voltage-differential input or transmits voltage-differential output, and the buses 108, 110 are SCSI buses, the card 200 includes a first transceiver 212. The first transceiver 212 converts the voltage levels of differential signals to the voltage level of signals utilized on a single-ended bus. In one embodiment, the transceiver 212 is a 9-Channel Differential Transceiver from Texas Instruments, part number SN75976A. The first transceiver 212 is electrically connected to the first host connector 206. Such a card 200 also preferably includes a first terminator 210 associated with the first backplane connector 202, which is required at an end of a SCSI or other single-ended bus. In one embodiment, the terminator is a DS2108 terminator from Dallas Semiconductor. Further, such a card 200 also includes a first isolator/expander 208, used to electrically isolate and retime signals on the single-ended bus, such as SCSI signals. The first isolator/expander 208 preferably also isolates the buses 108, 100 on the backplane 100 from the circuitry on the card 200. The first isolator/expander 208 is preferably located between, and electrically connected to both, the first backplane connector 202 and the transceiver 212. In one embodiment, the first isolator/expander 208 is an integrated circuit from LSI Logic, part number SYM53C140. Together, the first host connector 206, the first transceiver 212, the first isolator/expander 208, and the first backplane connector 202 define a first signal path 250. Signals can travel in both directions along the first signal path 250.

Similarly, the second backplane connector 204 is electrically connected to a second host connector 214 on the card 200, where the second host connector 214 is adapted for connection to a host computer (not shown). Between the second backplane connector 204 and the second host connector 214, the card 200 preferably includes a second transceiver 213 and a second isolator/expander 209 located between, and electrically connected to both, the second backplane connector 204 and the second transceiver 213. The card 200 also includes a second terminator 211 associated with the second backplane connector 204. Together, the second host connector 214, the second transceiver 213, the second isolator/expander 209 and the second backplane connector 204 define a second signal path 260. Signals can travel in both directions along the second signal path 260.

Preferably, the card 200 includes a bridge 216. The bridge 216 provides a controllable connection between the first bus 108 and the second bus 110. In one embodiment, the bridge 216 is the same integrated circuit used as the isolator/expander 208, 209, and preferably connects both isolator/expanders 208, 209. However, the bridge 216 may connect the first bus 108 to the second bus 110 at a different location on the card 200.

A controller 218 is also included on the card 200. The controller 218 is electrically connected to the other components on the card 200, such as the backplane connectors 202, 204, the host connectors 206, 214, the transceivers 212, 213, the terminators 210, 211, the isolator/expanders 208, 209 and the bridge 216. The connection between the controller 218 and the other components on the card 200 is preferably made by connecting to the circuitry on the card 200 that is in place to interlink those components, but may be made directly to each component if desired. The controller 218 preferably receives signals from and transmits command signals to those components on the card 200. In one embodiment, the controller 218 is a PLD chip from Altera, part number EPF6016A0C208-2. While the components on the card 200 have been discussed as separate and discrete components, they may be combined as desired to form larger or different integrated circuits or electrical assemblies, if desired.

Referring as well to FIG. 3, a schematic of an end view of the card 200 is shown. The first backplane connector 202 is positioned adjacent to the second backplane connector 204. However, other configurations and relative positions of the backplane connectors 202, 204 are possible. The card 200 also includes a panel switchbox 300. The panel switchbox 300 preferably includes a first DIP switch 302, a second DIP switch 304, a third DIP switch 306, a fourth DIP switch 308, and a fifth DIP switch 310. However, other types of switches may be used if desired, and additional switches may be provided if desired. Preferably, the panel switchbox 300 is located on the same end of the card 200 as the backplane connectors 202, 204, such that the DIP switches 302–310 are facing outward from and accessible from that end of the card 200. The functions of the DIP switches 302–310 are shown in Table 1.

TABLE 1

Functions of DIP Switches On Panel Switchbox 300

| DIP Switch | Function |
| --- | --- |
| First DIP Switch 302 | Determines whether bridge 216 is enabled. |
| Second DIP Switch 304 | Determines addresses for ports 106 of second bus 110. |
| Third DIP Switch 306 | Turns internal termination on or off for second host connector 216. |
| Fourth DIP Switch 308 | Determines addresses for ports 104 of first bus 108. |
| Fifth DIP Switch 310 | Turns internal termination on or off for first host connector 206. |

The function assignments listed in Table 1 may be changed if desired, such that different functions are mapped to different DIP switches. These switches 302–310 are utilized to control the operational configuration of the backplane 100 and of the system utilizing the backplane 100. As seen in Table 1, the second DIP switch 304 and the fourth DIP switch 308 are each associated with a particular bus, rather than a particular backplane connector 202, 204. Preferably, the first DIP switch 302, the second DIP switch 304 and the fourth DIP switch 308 are electrically connected to the controller 218. In this way, the positions of the switches 302, 304, 308 provide inputs to the controller 218, which acts on those inputs to control the appropriate components on the card 200. Preferably, the third DIP switch 306 controlling internal termination relative to the second host connector 216 is directly connected to the second terminator 211, and the fifth DIP switch 310 controlling internal termination relative to the first host connector 206 is directly connected to the first terminator 210. In this way, the third and fifth DIP switches 306, 310 can control bus termination whether or not power is applied to the controller 218.

The card 200 optionally may include a status light assembly 312 adapted to display one or more lights when certain activities are taking place over the bus. The configuration and presence of the status light assembly 312 are not critical to the invention.

Referring as well to FIG. 4, a schematic view of an internal switchbox 400 is shown. The internal switchbox 400 is preferably located on the upper surface of the card 200. The card 200 is preferably enclosed for protection; while the enclosure is not shown for clarity, the internal switchbox 400 is referred to as "internal" because it is located within that enclosure. The internal switchbox 400 preferably includes a first DIP switch 402, a second DIP switch 404, a third DIP switch 406 and a fourth DIP switch 408. However, other types of switches may be used if desired, and additional switches may be provided. The functions of the DIP switches 402–408 are shown in Table 2.

TABLE 2

Functions of DP Switches On Internal Switchbox 400

| DIP Switch | Function |
| --- | --- |
| First DP Switch 402 | Enables second bus 110 reset on disk drive insertion into or removal from a port 106. |
| Second DIP Switch 404 | Enables bus reset on second bus 110 power fail. |
| Third DIP Switch 406 | Enables first bus 108 reset on disk drive insertion into or removal from a port 104. |
| Fourth DIP Switch 408 | Enables bus reset on first bus 108 power fail. |

The function assignments listed in Table 2 may be changed if desired, such that different functions are mapped to different DIP switches, or the order of the DIP switches is changed. These switches 402–408 are utilized to control the operational configuration of the backplane 100 and of the system utilizing the backplane 100. Preferably, the switches 402–408 are electrically connected to the controller 218. In this way, the positions of the switches 402–408 provide inputs to the controller 218, which acts on those inputs to control the appropriate components on the card 200. Alternately, one or more of the switches 402–408 may be connected directly to one or more components on the card 200 to control directly those particular components. Additional switches may be provided in one or both switchboxes 300, 400 to provide additional functionality, if desired.

Figure 5:
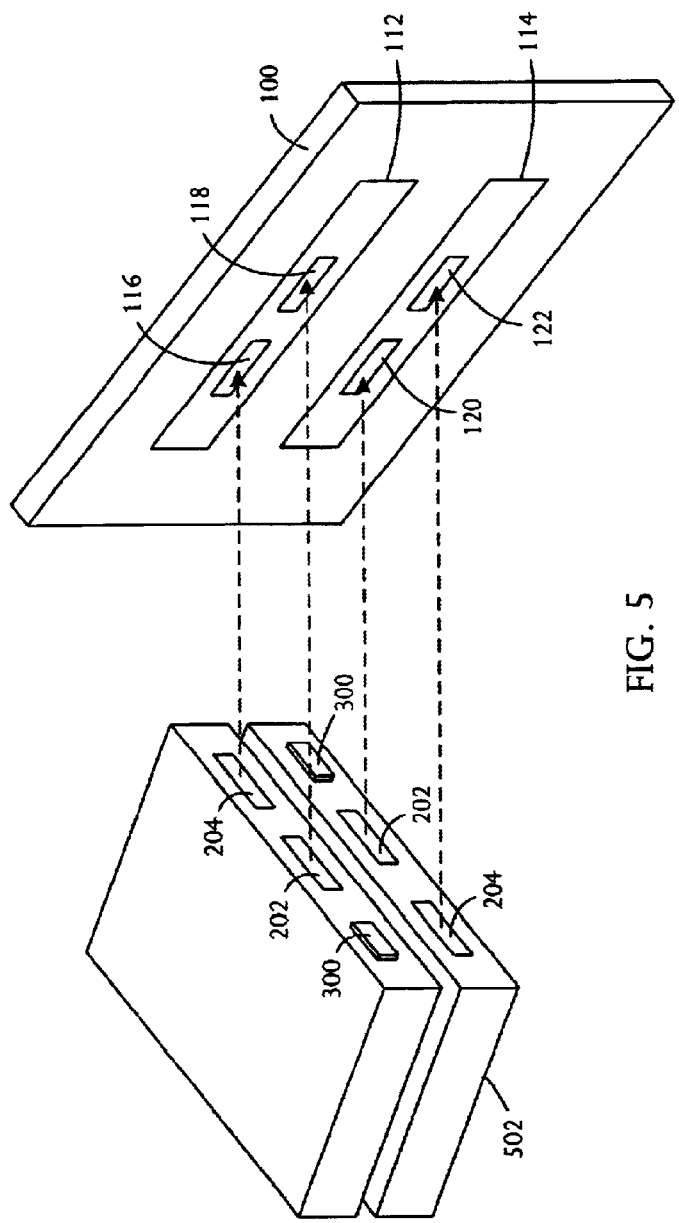
FIG. 5 is an exploded schematic view of two bus controller cards inserted into the backplane of FIG. 1.

Referring as well to FIG. 5, a backplane 100 receives a first bus controller card 500 and a second bus controller card 502. The first bus controller card 500 and the second bus controller card 502 each are the same as the card 200 described above. The first bus controller card 500 is inserted into the first bus controller slot 112, and the second bus controller card 502 is inserted into the second bus controller slot 114. Preferably, the first bus controller card 500 is installed into the first bus controller slot 112 in an orientation opposite from the orientation of the installation of the second bus controller card 502 into the second bus controller slot 114. By way of example, in one embodiment each bus controller card 500, 502 has a bottom surface 314, where the second bus controller card 502 is oriented such that its bottom surface 314 faces downward, and the first bus controller card 500 is oriented such that its bottom surface 314 faces upward. Therefore, connector 116 in the first bus controller slot 112 and connector 120 in the second bus controller slot 114 are both electrically connected to the second bus 110. Further, connector 118 in the first bus controller slot 112 and connector 122 in the second bus controller slot 114 are both electrically connected to the first bus 108. As a result, the first backplane connector 202 of the first bus controller card 500 connects to a different bus than the first backplane connector 202 of the second bus controller card 502. Similarly, the second backplane connector 204 of the first bus controller card 500 connects to a different bus than the second backplane connector 204 of the second bus controller card 502. Thus, the first backplane connector 202 and the second backplane connector 204 of each bus controller card 500, 502 are each associated with a different bus 108, 110, depending on the slot 112, 114 into which the particular bus controller card 500, 502 is inserted. As a result, the first signal path 250 and the second signal path 260 of each bus controller card 500, 502 are each associated with a different bus 108, 110.

The panel switchbox 300 and the internal switchbox 400 on each bus controller card 500, 502 are used to configure that card 500, 502. The switches 302–310 on both bus controller cards 500, 502 are set in a manner that allows the cards 500, 502 to operate simultaneously without creating conflicts on the buses 108, 110.

In order to facilitate the proper setting of the switches 302–310 on each bus controller card 500, 502, the relationship between the switches 302–310 and the backplane connectors 202, 204 on each bus controller card 500, 502 changes depending on the orientation with which each particular card 500, 502 is inserted into one of the bus controller slots 112, 114. That is, each bus controller card 500, 502 detects its orientation in one of the bus controller slots 112, 114, then accordingly manages the relationship between DIP switches on the card and control signals to the card and the backplane. The controller 218 of each bus controller card 500, 502 detects the card's orientation in a particular slot 112, 114 by checking each backplane connector 202, 204 for the presence of a signal or signals characteristic of the first bus 108 and/or the second bus 110. Such a signal may be a clock signal associated with a particular bus 108, 110, a dedicated enabling or monitor signal associated with a particular bus 108, 110, or another signal. The particular signal or signals utilized are not critical to the invention.

Figure 6:
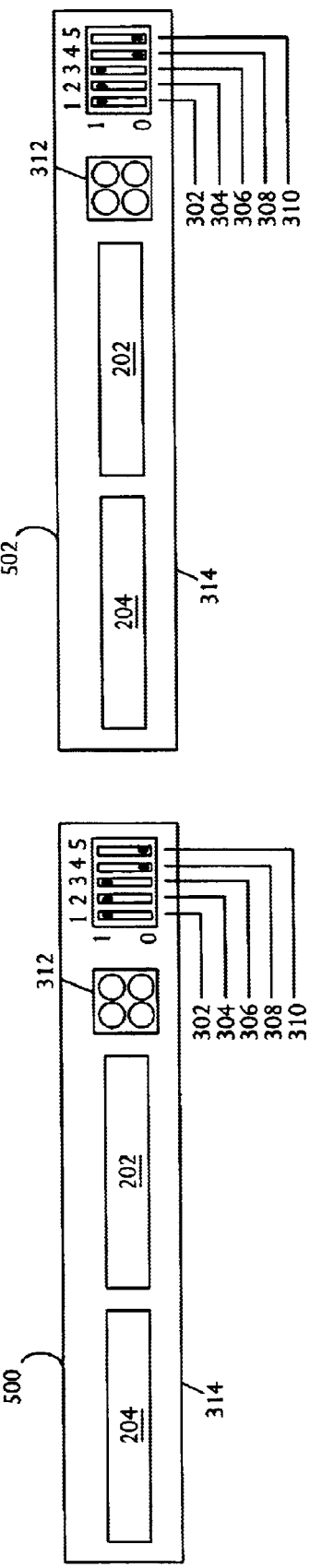
FIG. 6 is a schematic end view of a first bus controller card and a second bus controller card placed in a reference orientation with regard to one another.

Because the controller 218 detects the orientation of each card 500, 502 in a particular slot 112, 114, the controller 218 assigns the functions of the second DIP switch 304 and the fourth DIP switch 308, which are associated with a particular bus 108, 110, to the proper signal path 250, 260 on the particular card 500, 502. As a result, in a preferred embodiment the position of the switches 302–310 on each bus controller card 500, 502 is identical when the cards 500, 502 are both oriented with their bottom surfaces 314 facing in the same direction, as seen in FIG. 6. That is, the switches 302–310 have the same position on each card 500, 502 when the cards 500, 502 both are viewed in a reference orientation. In this way, a technician or user may place both bus controller cards 500, 502 on a tabletop or other flat surface and configure the switches 302–310 of each bus controller card 500, 502 in the identical manner, easily configuring the bus controller cards 500, 502 for simultaneous operation on the backplane 100. However, the cards need not be physically placed in a reference orientation when the switches 302–310 are set. That is, a user may visualize a reference orientation while setting the switches 302–310, thereby placing the bus controller cards 500, 502 in a reference orientation without physically moving the cards 500, 502.

An example of the orientation of the switches 302–310 on each card 500–502 is shown in FIGS. 5 and 6. In an exemplary embodiment, the first bus controller card 500 is inserted into the first bus controller slot 112, oriented with its bottom surface 314 facing upward. Thus, the first backplane connector 202 of the first bus controller card 500 is connected to the second connector 118 of the first bus controller slot 112, such that the first backplane connector 202 of the first bus controller card 500 is connected to the first bus 108. Consequently, the first signal path 250 on the first bus controller card 500 is connected to the first bus 108. Also, the second backplane connector 204 of the first bus controller card 500 is connected to the first connector 116 of the first bus controller slot 112, such that the second backplane connector 204 of the first bus controller card 500 is connected to the second bus 110. Consequently, the second signal path 260 on the first bus controller card 500 is connected to the second bus 110. The second bus controller card 502 is inserted into the second bus controller slot 114, oriented with its bottom surface 314 facing downward. Thus, the first backplane connector 202 of the second bus controller card 502 is connected to the first connector 120 of the second bus controller slot 114, such that the first backplane connector 202 of the second bus controller card 502 is connected to the second bus 110. Consequently, the first signal path 250 of the second bus controller card 502 is connected to the second bus 110. Also, the second backplane connector 204 of the second bus controller card 502 is connected to the second connector 122 of the second bus controller slot 114, such that the second backplane connector 204 of the second bus controller card 502 is connected to the first bus 108. Consequently, the second signal path 260 of the second bus controller card 502 is connected to the first bus 108.

Turning to FIG. 6, the switches 302–310 of both bus controller cards 500, 502 are in the same position when the two bus controller cards 500, 502 are in the same orientation, which may be an orientation in which the bottom surface 314 of each card 500, 502 is resting on the same flat surface, such as a tabletop. In this way the positions of the switches 302–310 on each card 500, 502 can be inspected visually to determine easily whether the switches 302–310 are in the same position on each card 500, 502. Looking to the first bus controller card 500, and referring to Table 1, the first DIP switch 302 is set high to activate the bridge 216. The second DIP switch 304 is set high to address the second bus 110 with a first set of addresses, where the first set of addresses is provided for the ports 106 of the second bus 110 and a second set of addresses is provided for the ports 104 of the first bus 108. The high position is associated with the first set of addresses and the low position is associated with the second set of addresses. The second bus 110 is associated with the second backplane connector 204 of the first bus controller card 500, and the first connector 116 of the first bus controller slot 112. Thus, second bus 110 addressing is performed via the second backplane connector 204 of the first bus controller card 500. The third DIP switch 306 is set high to turn on internal termination for the second host connector 214, thereby activating the second terminator 211. The second terminator 211 terminates inside the first bus controller card 500 an external bus connected to the second host connector 214. The fourth DIP switch 308 is set low to address the first bus 108 with the second set of addresses. The first bus 108 is associated with the first backplane connector 202 of the first bus controller card 500, and the second connector 118 of the first bus controller slot 112. Thus, first bus 108 addressing is performed via the first backplane connector 202 of the first bus controller card 500. The fifth DIP switch 310 is set low to turn off internal termination for the first host connector 206, thereby deactivating, or not activating, the first terminator 210, such that an external bus connected to the first host connector 206 is not terminated.

Looking to the second bus controller card 502, and referring to Table 1, the first DIP switch 302 is set high to activate the bridge 216. The second DIP switch 304 on the second bus controller card 502 is set high to address the second bus 110 with the first set of addresses. The second bus 110 is associated with the first host connector 206 and the first signal path 250 of the second bus controller card 502, and the first connector 120 of the second bus controller slot 114. Thus, both of the bus controller cards 500, 502 properly address the second bus 110 with a first set of addresses corresponding to the ports 106 of the second bus 110, even though the first bus controller card 500 addresses the second bus 110 via its second backplane connector 204 and the second bus controller card 502 addresses the second bus 110 via its first backplane connector 202. The third DIP switch 306 is set high to turn on internal termination for the second host connector 214, thereby activating the second terminator 211. The second terminator 211 terminates inside the first bus controller card 500 an external bus connected to the second host connector 214. The fourth DIP switch 308 on the second bus controller card 502 is set low to address the first bus 108 with the second set of addresses. The first bus 108 is associated with the second backplane connector 204 and the second signal path 260 of the second bus controller card 502, and the second connector 122 of the second bus controller slot 114. Thus, both of the bus controller cards 500, 502 properly address the first bus 108 with a second set of addresses corresponding to the ports 104 of the first bus 108, even though the first bus controller card 500 addresses the first bus 108 via its first backplane connector 202 and the second bus controller card 502 addresses the first bus 108 via its second backplane connector 204. The fifth DIP switch 310 is set low to turn off internal termination for the first host connector 206, thereby deactivating, or not activating, the first terminator 210, such that an external bus connected to the first host connector 206 is not terminated.

By setting the switches 302–310 on each bus connector card 500, 502 to the same position, the two cards 500, 502 can function together on the backplane 100 without conflict. As can be seen, the second DIP switch 304 and the fourth DIP switch 308 are each associated with a particular bus 108, 110, and the third DIP switch 306 and the fifth DIP switch 310 are each associated with a particular backplane connector 202, 204 on a particular bus controller card 500, 502. Thus, the switches 302–310 on each bus connector card 500, 502 may be set to the same position while the cards 500, 502 are in the same reference position such that the cards 500, 502 function together on the backplane 100 without conflict. Referring to Table 1, it can be seen that the switches 300–310 may be set in other positions, as long as the positions of the switches 300–310 is the same for both cards 500, 502 where both cards 500, 502 are in the same reference orientation. For example, the second DIP switch 304 may be set low and the fourth DIP switch 308 may be set high on both cards 500, 502 to change the addresses assigned to the ports 104, 106 of each bus 108, 110.

The settings of the DIP switches 402–408 on the internal switchbox 400 on each card 500, 502 also correspond in the same manner as the DIP switches 302–310 on each card 500, 502. As an example, if each of the DIP switches 402–408 are set high on the first bus controller card 500, then each of the DIP switches 402–408 on the second bus controller card 502 are also set high.

Where two bus controller cards 500, 502 are used, preferably a first bus controller card 500 is a master card and a second bus controller card 502 is a servant card. However, the first bus controller card 500 may be a servant card and the second bus controller card 502 may be a master card, if desired. The first bus controller card 500, acting as the master card, is responsible for operating the buses 108, 110, as well as bus addressing and internal card termination, as discussed above. The second bus controller card 502, acting as the servant card, is responsible for bus addressing and internal card termination as well. However, the servant card 502 is not responsible for operating the buses 108, 110, and responds to bus operation commands from the master card 500 instead of initiating those commands itself. The master card 500 and the servant card 502 are preferably physically and electrically the same bus controller card 200, with "master" and "servant" denoting functions of the bus controller cards 200 rather than unique physical configurations. In another embodiment, where more than two bus controller cards 200 are used, only one of the cards 200 is a master card, and the remaining cards 200 are all servant cards. Due to compatibility considerations, the backplane 100 may be adapted to receive in the bus controller slots 112, 114 more than one model of bus controller card 200. In one embodiment, different models of bus controller card 200 utilize different voltage differential interfaces to the buses 108, 110. For example, a backplane 100 in a Hewlett-Packard HVD10 disk enclosure may be adapted to receive either HVD10 or SC10 bus controller cards 200, where the HVD10 card 200 utilizes a high voltage differential (HVD) interface to the SCSI buses 108, 110, and the SC10 utilizes a low voltage differential (LVD) interface to the SCSI buses 108, 110. However, different models of bus controller card 200 can be differentiated by other characteristics.

Figure 7:
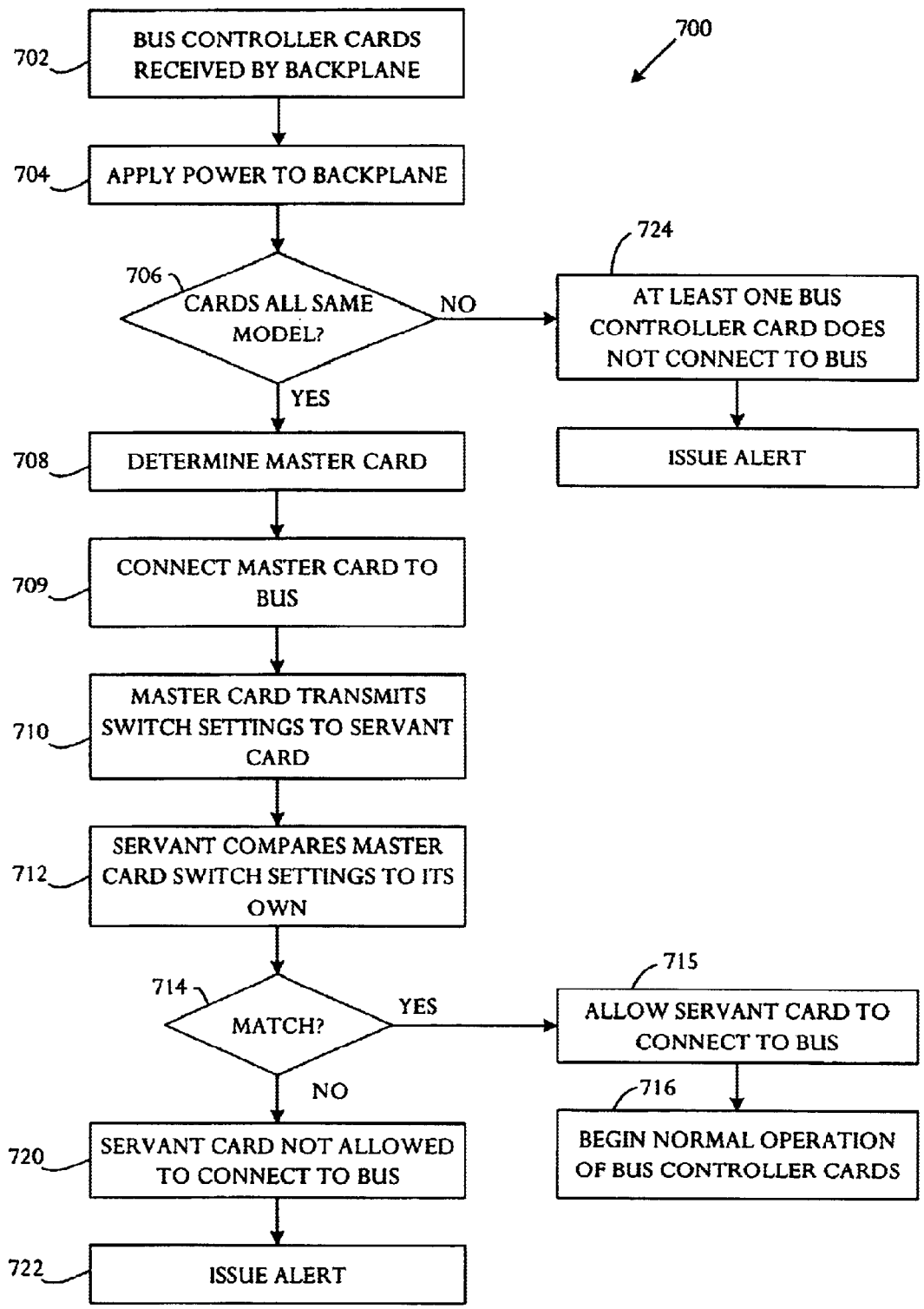
FIG. 7 is a flowchart of a process for data corruption avoidance, showing the steps followed where two bus controller cards are received on the backplane before power is applied.

Because more than one bus controller card 200 can be inserted into the backplane 100, multiple cards are operated in a manner to prevent corruption or loss of data traveling over the buses 108, 110, and to prevent other problems from occurring on the buses 108, 110. Referring to FIG. 7, a method 700 for avoiding data corruption on the buses 108, 110 is shown, where bus controller cards 200 are received on the backplane 100 before power is applied to it. In step 702, a plurality of bus controller cards 200 are received on the backplane 100. Preferably, two bus controller cards 200 are received on the backplane 100.

Next, in step 704, power is applied to the backplane 100 and the cards 200. The bus controller cards 200 then enter a power-up mode that lasts until normal operation of the cards 200 begins later in the process 700. Preferably, each bus controller card 200 then drives a signal low on the backplane 100 to inform the other bus controller card 200 on the backplane 100 of its presence. Rather than driving a signal low on the backplane 100, a bus controller card 200 may utilize other methods to inform any other bus controller card of its presence on the backplane 100, such as transmitting a signal, driving a signal high, or another method. Preferably, each different model of bus controller card 200 drives a different signal. For example, in a Hewlett Packard HVD10 disk enclosure, the model HVD10 bus controller card 200 drives signals DETECT# and DDTECT# low to inform another bus controller card of its presence on the backplane 100, and the model SC10 bus controller card drives the signal DDETECT# low while leaving the DDETECT# signal high to inform another bus controller card 200 of its presence.

In step 706, it is determined whether both bus controller cards 200 are the same model. Preferably, at least one bus controller card 200 detects the presence of a signal driven or transmitted by another bus controller card 200. This detection is preferably performed by the controller 218. By assigning a different signal to each different model of bus controller card, a particular bus controller card 200 can distinguish the presence of a different model of bus controller card 200 in a different slot 112, 114, and can distinguish between the absence of a bus controller card 200 from the other slot 112, 114 and the presence of a different model of bus controller card 200 in that slot 112, 114.

If the two bus controller cards 200 are the same model, then the process continues to step 708. In step 708, it is determined which of the bus controller cards 200 is the master card 500 and which is the servant card 502. In one embodiment, the bus controller card 200 that is resident in the first bus controller slot 112 is the master card 500. Preferably, the controller 218 of the master card 500 drives a signal to, or reads a signal to or from, the backplane 100, indicating that a master card 500 is present on the backplane 100. The second bus controller card 502 connected to the second bus controller slot 114 detects that signal, and as a result the controller 218 on the second bus controller card 502 configures that card 502 to be a servant card 502. Preferably, if the first bus controller card 500 is removed from the backplane 100, then the signal generated or driven by that card 500 is no longer present, and the second bus controller card 502, sensing the absence of that signal, issues a bus reset over the buses 108, 110, and its controller 218 reconfigures it from a servant card to a master card. Alternately, other methods may be used to determine which of the bus controller cards 200 is the master card and which is the servant card, if desired.

After the master card 500 and the servant card 502 have been established, the process moves to step 709, in which the master card 500 is connected to the buses 108, 110. Next, in step 710, the master card 500 transmits the settings of its switches 302–310, 402–408 across the backplane 100 to the servant card 502. In one embodiment, each switch 302–310, 402–408 on the master card 500 has a separate electrical connection to the servant card 502, for transmitting the settings of each switch 302–310, 402–408 to the controller 218 of the servant card 502. In another embodiment, this transmission includes a data word having at least as many bits as the number of switches, associated with a header identifying that data word as carrying the settings of the switches 302–310 of the master card 500. Next, in step 712, the controller 218 of the servant card 502 then compares those settings to the settings of its own switches 302–310, 402–408. Such a comparison is standard in the art. Next, in step 714, if the positions of the switches 302–310, 402–408 on the servant card 502 match the positions of the switches 302–310, 402–408 on the master card 500, the process continues to step 715. In step 715, the servant card 502 is allowed to connect to the buses 108, 110. Next, in step 716, the master card 500 and the servant card 502 exit the power-up phase and begin normal operation as the master card 500 and the servant card 502.

If in step 714 the positions of the switches 302–310 on the servant card 502 do not match the positions of the switches 302–310 on the master card 500, the process continues to step 720. In step 720, the servant card 502 remains disconnected from the buses 108, 110, in order to prevent data corruption or other problems that may result from a DIP switch mismatch between the master card 500 and the servant card 502. Control over the connection between the servant card 502 and the buses 108, 110 is preferably performed by the controller 218; the servant card 502 remains physically in place on the backplane 100, but is functionally disconnected from the buses 108, 110 as a result of isolation imposed by the controller 218. Such functional disconnection continues until the mismatched switches 302–310, 402–408 are corrected, if ever. In one embodiment, the transceivers 212, 213 and the isolator/expanders 208, 209 on the servant card 502 are never enabled, to keep the servant card 502 disconnected from the buses 500, 502; that is, the controller 218 never issues a command to enable the transceivers 212, 213 or the isolator/expanders 208, 209. Optionally, in step 722 the servant card 502 issues an alert that its switches are mismatched. In one embodiment, the controller 218 transmits the issued alert signal to the status light assembly 312 to activate a fault light. The controller 218 may also activate a buzzer (not shown) or other alert device to draw attention to the problem from an operator or technician.

If in step 706 the two bus controller cards 200 are determined to be different models, then the process moves from step 706 to step 724. In step 724, one bus controller card 200 remains in the power-up state, and does not connect to the buses 108, 110. Preferably, where one bus controller card 200 has an HVD interface to the buses 108, 110 and the other card 200 has an LVD interface to the buses 108, 110, the bus controller card 200 having an HVD interface does not connect to the buses 108, 110. For example, in the Hewlett Packard HVD10 disk enclosure, where one bus controller card 200 is an HVD10 card having an HVD interface and the other bus controller card 200 is an SC10 card having an LVD interface, the HVD10 card remains in the power-up state and does not connect to the buses 108, 110. In this way, conflict and data corruption that may result from the attempted simultaneous operation of two different models of bus controller cards 200 is avoided. Alternately, the card 200 having an HVD interface may connect to the buses 108, 110, and the card 200 having an LVD interface does not connect to the buses 108, 110. Optionally, in step 726, the bus controller card 200 remaining in the power-up state issues an alert. In one embodiment, the controller 218 transmits the issued alert signal to the status light assembly 312 to activate a fault light.

Figure 8:
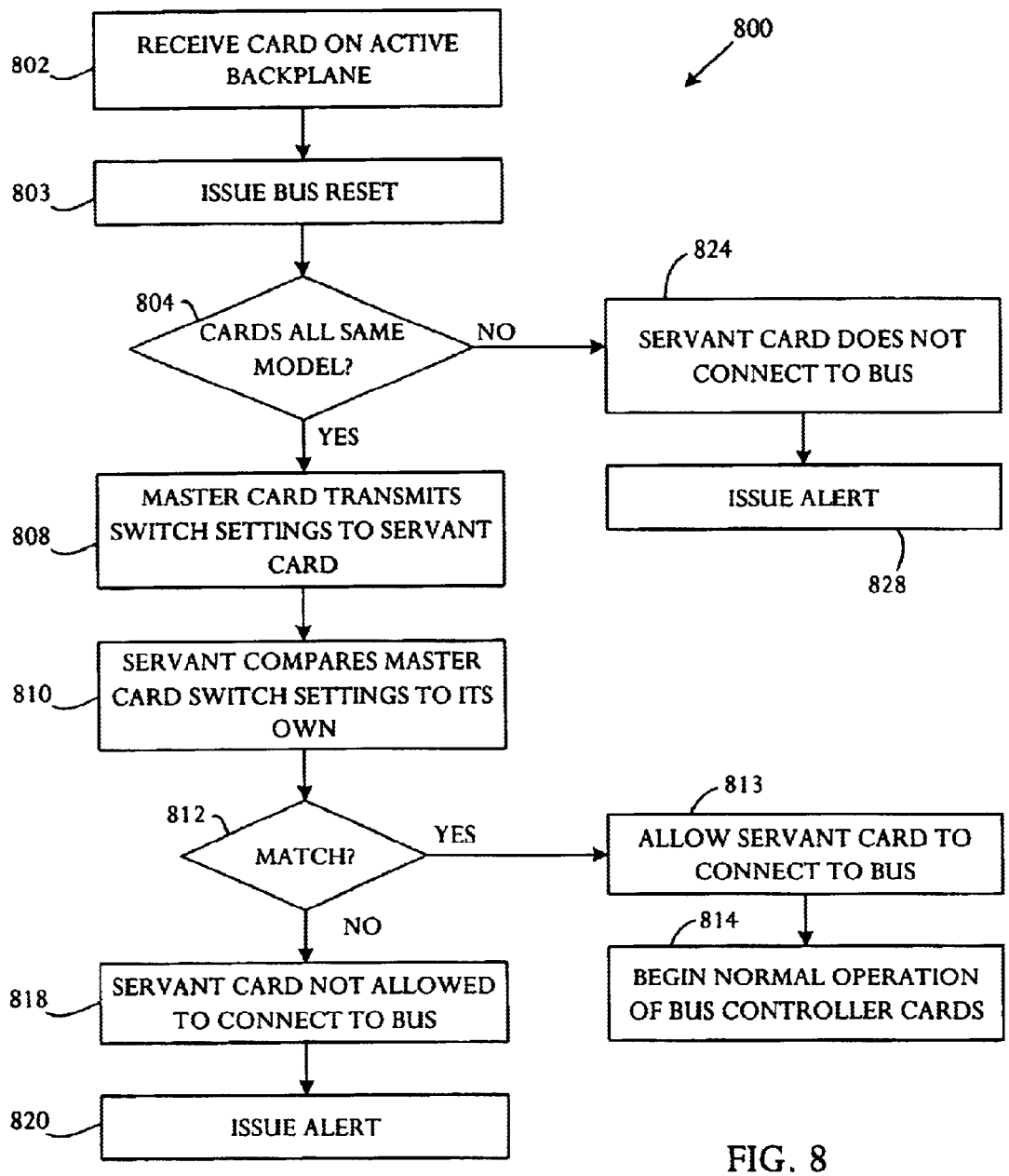
FIG. 8 is a flowchart of a process for data corruption avoidance, showing the steps followed where a bus controller card is received on the backplane while power is applied to the backplane.

Referring to FIG. 8, a method 800 for avoiding data corruption on the buses 108, 110 is shown, where a bus controller card 200 is received on the backplane 100 while power is applied to the backplane. In step 802, a bus controller card 200 is received on the backplane 100 in a slot 112, 114 while power is applied to the backplane 100. Inserting a bus controller card 200 into an available bus controller slot 112, 114 on the backplane 100 while the backplane 100 is powered may be referred to as a "hot swap." Another bus controller card 200 is already in place in the other slot 112, 114 on the backplane 100 during the hot swap. That card already in place is designated as the master card 500, because it is the only card on the backplane 100 before step 802, and therefore already controls the buses 108, 110. The bus controller card 200 inserted in step 802 is the servant card 502. Next, in step 803, the master card 500 issues a bus reset, resetting the buses 108, 110. In one embodiment, the bus reset signal lasts substantially 200 milliseconds.

Next, if in step 804 the two bus controller cards 200 are determined to be the same model, the process 800 moves to step 808. Steps 808–820 then proceed in the same manner as described above with regard to steps 710–722 of the process 700.

If in step 804 the two bus controller cards 200 are determined to be different models, then the process moves from step 804 to step 824. Next, in step 824, the servant card 502 remains disconnected from the buses 108, 110, in order to prevent data corruption or other problems that may result from the use of two different models of bus controller cards 200. Control over the connection between the servant card 502 and the buses 108, 110 is preferably performed by the controller 218; the servant card 502 remains physically in place on the backplane 100, but is functionally disconnected from the buses 108, 110 as a result of isolation imposed by the controller 218. In one embodiment, the transceivers 212, 213 and the isolator/expanders 208, 209 on the servant card 502 are not enabled in order to keep the servant card 502 disconnected from the buses 500, 502, where the controller 218 does not issue a command to enable the transceivers 212, 213 and the isolator/expanders 208, 209. Optionally, in step 828 the master card 500 issues an alert. In one embodiment, the controller 218 of the master card 500 transmits the issued alert signal to the status light assembly 312 on the master card 500 to activate a fault light.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A method for avoiding data corruption on a bus extending onto a backplane adapted to receive at least two bus controller cards for connection to the bus, each bus controller card having a plurality of switches controlling its configuration, where different models of bus controller may be received by the backplane, comprising:

receiving the bus controller cards onto the backplane with the backplane unpowered;

applying power to the backplane;

comparing the model of each bus controller card received by the backplane further comprising:

generating information at each bus controller card corresponding to the model of that bus controller card;

transmitting said information to each bus controller card; and analyzing said information at each bus controller card;

selectively connecting the bus controller cards to the bus utilizing said comparison;

and if said comparison determines that all of the bus controller cards are of the same model:

determining which of the bus controller cards acts as a master card and which of the bus controlled cards acts as a servant card;

connecting said master card to the bus;

transmitting from said master card to each said servant card the settings of the switches on said master card;

comparing at each said servant card said settings transmitted by said master card with the settings of the switches on said servant card; and if said setting of the switches on said master card differs from said setting of the switches on said servant card, preventing said servant card from connecting to the bus.

2. The method of claim 1, wherein said comparing determines that at least one bus controller card is a different model from another bus controller card, further comprising leaving said at least one different model of bus controller card disconnected from the bus.

3. The method of claim 2, wherein the bus controller cards comprise one high voltage differential bus controller card and one low voltage differential bus controller card having a interface to the bus, wherein said at least one different model of bus controller card left disconnected from the bus is said high voltage differential bus controller card.

4. The method of claim 1, wherein said comparing determines that said setting of the switches on said master card is the same as said setting of the switches on said servant card; further comprising connecting said servant card to the bus.

5. The method of claim 1, wherein said determining makes the bus controller card received at a particular location on the backplane said master card.

6. The method of claim 1, wherein said receiving comprises receiving a first bus controller card onto the backplane;

applying power to the backplane;

receiving a second bus controller card onto the backplane;

issuing a bus reset command;

designating said first bus controller card as a master card; and designating said second bus controller card as a servant card.

7. The method of claim 6, wherein said comparing determines that said master card is a different model from said servant card, further comprising leaving said servant card disconnected from the bus.

8. The method of claim 6, wherein said comparing determines that said master card and said servant card are of the same model, and wherein said selectively connecting comprises:

transmitting from said master card to each said servant card the settings of the switches on said master card;

comparing at each said servant card said settings transmitted by said master card with the settings of the switches on said servant card.

9. The method of claim 8, wherein said comparing determines that said setting of the switches on said master card differs from said setting of the switches on said servant card; further comprising issuing a bus reset command from said servant card; and preventing said servant card from connecting to the bus.

10. The method of claim 8, wherein said comparing determines that said setting of the switches on said master card is the same as said setting of the switches on said servant card; further comprising connecting said servant card to the bus.

11. A method for avoiding data corruption on a bus extending onto a backplane adapted to receive two bus controller cards for connection to the bus, each bus controller card having a plurality of switches controlling its configuration, where different models of bus controller may be received by the backplane, comprising:

receiving both of the bus controller cards onto the backplane while the backplane is unpowered;

applying power to the backplane;

generating information at each bus controller card corresponding to the model of that bus controller card;

transmitting said information to each bus controller card;

analyzing said information at each bus controller card, wherein each bus controller card is determined to be the same model;

determining which of the bus controller cards acts as a master card and which of the bus controller cards acts as a servant card;

connecting said master card to the bus;

transmitting from said master card to said servant card the settings of the switches on said master card;

comparing at said servant card said settings transmitted by said master card with the settings of the switches on said servant card; and selectively connecting said master card and said servant card to the bus based on said comparing.

12. A method for avoiding data corruption on a bus extending onto a backplane adapted to receive two bus controller cards for connection to the bus, each bus controller card having a plurality of switches controlling its configuration, where different models of bus controller may be received by the backplane, comprising:

receiving a first bus controller card onto the backplane;
applying power to the backplane;
receiving a second bus controller card onto the backplane;
issuing a bus reset command;
designating said first bus controller card as a master card;
designating said second bus controller card as a servant card;
generating information at each bus controller card corresponding to the model of that bus controller card;
transmitting said information to each bus controller card;
analyzing said information at each bus controller card, wherein each bus controller card is determined to be the same model;
transmitting from said master card to each said servant card the settings of the switches on said master card;
comparing at each said servant card said settings transmitted by said master card with the settings of the switches on said servant card; and
selectively connecting said master card and said servant card to the bus based on said comparing.

* * * * *